US009709422B2

(12) United States Patent
Nishimoto et al.

(10) Patent No.: US 9,709,422 B2
(45) Date of Patent: Jul. 18, 2017

(54) ROTATION ANGLE AND STROKE AMOUNT DETECTION DEVICE (71) Applicant: DENSO CORPORATION, Kariya, Aichi-pref. (JP)

(72) Inventors: Seiji Nishimoto, Kariya (JP); Akitoshi Mizutani, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/927,688

(22) Filed: Oct. 30, 2015

(65) Prior Publication Data
US 2016/0123769 A1 May 5, 2016

(30) Foreign Application Priority Data

Nov. 4, 2014 (JP) ................. 2014-224085

(51) Int. Cl.
*G01B 7/30* (2006.01)
*G01D 5/14* (2006.01)
*G01D 5/20* (2006.01)
*G01B 7/312* (2006.01)

(52) U.S. Cl.
CPC ............. *G01D 5/145* (2013.01); *G01B 7/312* (2013.01); *G01D 5/2046* (2013.01)

(58) Field of Classification Search
CPC .......... G01P 3/443; G01P 3/488; G01P 3/487; G01P 3/481; G01P 3/685; G01P 1/026; G01P 3/66; G01P 3/68; G01P 3/665; G01D 5/145; G01D 5/147; G01D 5/2457; G01D 5/2013; G01D 5/2046; G01B 7/30; G01B 7/312; G01B 7/14

USPC ................ 324/173–174, 178–179, 161, 162, 324/207.2–207.25, 259
See application file for complete search history.

(56) References Cited

U.S. PATENT DOCUMENTS

| 8,004,277 | B2 * | 8/2011 | Patil | ................... | B62D 15/0215 |
| | | | | | 324/207.25 |
| 8,378,664 | B2 * | 2/2013 | Hinz | ...................... | G01D 5/145 |
| | | | | | 324/207.13 |
| 2005/0030012 | A1 * | 2/2005 | Kunz-Vizenetz | ...... | G01D 5/145 |
| | | | | | 324/207.25 |
| 2010/0231205 | A1 * | 9/2010 | Jerance | ................... | G01D 5/145 |
| | | | | | 324/207.23 |
| 2012/0262157 | A1 * | 10/2012 | Liebart | ................... | G01D 5/145 |
| | | | | | 324/207.2 |

(Continued)

*Primary Examiner* — Thang Le
(74) *Attorney, Agent, or Firm* — Nixon & Vanderhye PC (57) ABSTRACT

A rotation angle and stroke amount detection device includes a sensor unit, a rotation angle calculation unit, and a stroke amount calculation unit. The sensor unit includes sin and cos sensors which are magnetic sensing elements that detect changes in a magnetic field caused by rotation or linear displacement of a detection target. The sensor unit outputs sin and cos signals based on detection values of the sin and cos sensors. The rotation angle calculation unit calculates a rotation angle of the detection target based on the sin and cos signals output by the sensor unit. The stroke amount calculation unit calculates a stroke amount of the detection target based on the same signals as those used by the rotation angle calculation unit, i.e., the sin and cos signals. Accordingly, the configuration of the sensor unit may be simplified and the physical size of the device may be reduced.

6 Claims, 5 Drawing Sheets

(56) References Cited

U.S. PATENT DOCUMENTS

| | | | |
|---|---|---|---|
| 2013/0018619 A1* | 1/2013 | Hara | G01B 21/00 |
| | | | 702/86 |
| 2014/0184204 A1* | 7/2014 | Kouno | G01B 7/003 |
| | | | 324/207.13 |
| 2015/0192152 A1* | 7/2015 | Kageyama | G01D 5/145 |
| | | | 324/207.12 |

* cited by examiner

DEFINE $\alpha$ = ATAN2 (Yc, Ys)
BUT, R = (Ys/Yc), $-90 <$ arctanR $< 90$

| Yc | Ys | $\alpha$ (UNIT: [°]) | ($\alpha$ RANGE) |
|---|---|---|---|
| Yc > 0 | Ys ≥ 0 | $\alpha$ = arctanR | (0 ≤ $\alpha$ < 90) |
| Yc = 0 | Ys > 0 | $\alpha$ = 90 | |
| Yc < 0 | Ys ≥ 0 | $\alpha$ = arctanR + 180 | (90 < $\alpha$ ≤ 180) |
| Yc < 0 | Ys < 0 | $\alpha$ = arctanR + 180 | (180 < $\alpha$ < 270) |
| Yc = 0 | Ys < 0 | $\alpha$ = 270 | |
| Yc > 0 | Ys < 0 | $\alpha$ = arctanR + 360 | (270 < $\alpha$ < 360) |

FIG. 6

ROTATION ANGLE AND STROKE AMOUNT DETECTION DEVICE

CROSS REFERENCE TO RELATED APPLICATION

The present application is based on Japanese Patent Application No. 2014-224085 filed on Nov. 4, 2014, disclosure of which is incorporated herein by reference.

TECHNICAL FIELD

The present disclosure is related to a rotation angle and stroke amount detection device that detects a rotation angle and a stroke volume of a detection target, the detection target being rotatable about an axis of rotation and being linearly displaceable along the axis of the rotation.

BACKGROUND

Conventionally known rotation angle detection devices detect a rotation angle of a detection target based on information about a magnetic field generated by the detection target. For example, JP 2013-019829 A describes a device that detects a rotation angle for the rotation of a detection target (e.g., a yoke) attached to a permanent magnet, by using a magnetic sensing element such as a Hall element to detect a magnetic field.

SUMMARY

If the detection target is linearly displaceable along the axis of rotation in addition to being rotatable, then the rotation angle detection device of JP 2013-019829 A is not able to detect a stroke amount of the linear displacement. In order to detect both the rotation angle as well as the stroke amount of the detection target, a separate stroke sensor is needed in addition to a rotation angle sensor. Further, the stroke sensor detects stroke based on different information as compared to the rotation angle sensor. As a result, the configuration of the sensor unit may become complex, and the physical size of the detection device may increase.

In view of the above, it is an object of the present disclosure to provide a rotation angle and stroke amount detection device, which has a simple configuration, that detects a rotation angle and a stroke amount of a rotatable and linearly displaceable detection object.

In one aspect of the present disclosure, there is provided a rotation angle and stroke amount detection device for detecting a rotation angle and a stroke amount of a detection target which generates a magnetic field, the detection target being rotatable about an axis of rotation and linearly displaceable along the axis of rotation. Here, the rotation angle and stroke amount detection device includes a sensor unit that includes a plurality of magnetic sensing elements that detect changes in the magnetic field caused by a rotation and a linear displacement of the detection target, the sensor unit outputting a signal based on detection values of the plurality of magnetic sensing elements, a rotation angle calculation unit that calculates a rotation angle of the detection target based on the signal output by the sensor unit, and a stroke amount calculation unit that calculates a stroke amount of the detection target based on a same signal as that used by the rotation angle calculation unit.

In the rotation angle and stroke amount detection device of the present disclosure, the rotation angle calculation unit calculates the rotation angle of the detection target and the stroke amount calculation unit calculates the stroke amount of the detection target based on the same signals output from the sensor unit, which are based on detection values of the magnetic sensing elements. Accordingly, the configuration of the sensor unit may be simplified, and the physical size of the rotation angle and stroke amount detection device may be reduced.

In a preferable aspect of the present disclosure, two of the plurality of magnetic sensing elements, which are positioned orthogonal to each other on the axis of rotation, include a sin sensor that outputs a sin signal according to the rotation angle of the detection target and a cos sensor that outputs a cos signal according to the rotation angle of the detection target, and the sensor unit includes at least one set of the sin sensor and the cos sensor.

In a further preferable aspect of the present disclosure, the rotation angle calculation unit calculates the rotation angle of the detection target by calculating an arctangent of a ratio between the sin signal and the cos signal.

In a further preferable aspect of the present disclosure, the rotation angle and stroke amount detection device further includes a maximum amplitude calculation unit that calculates a maximum amplitude of the sin signal and the cos signal based on a ratio between (i) the sin signal or the cos signal, and (ii) a sin value or a cos value of the rotation angle of the detection target calculated by the rotation angle calculation unit, the maximum amplitude corresponding to the stroke amount of the detection target.

In this case, the stroke amount calculation unit calculates the stroke amount of the detection target based on the maximum amplitude calculated by the maximum amplitude calculation unit. The stroke amount calculation unit may use, e.g., a map or a relational expression for this calculation.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

Hereinafter, a rotation angle and stroke amount detection device according to embodiments of the present disclosure will be explained with reference to the figures.

First Embodiment

The detection principle of a rotation angle and stroke amount detection device according to a first embodiment of the present disclosure will be explained with reference to FIGS. 1 and 2. As shown schematically in FIGS. 1 and 2, a detection target 8 of a rotation angle and stroke amount detection device includes a shaft portion 81 and a disc portion 82. The shaft portion 81 is disposed along an axis of rotation P, and the disc portion 82 is rotatable about the axis of rotation P. The detection target 8 is rotatable about the axis of rotation P, and in addition, is linearly displaceable along the axis of rotation P. Specifically, the detection target 8 is rotatable over 360°, and is linearly displaceable over a limited range.

Figure 1:
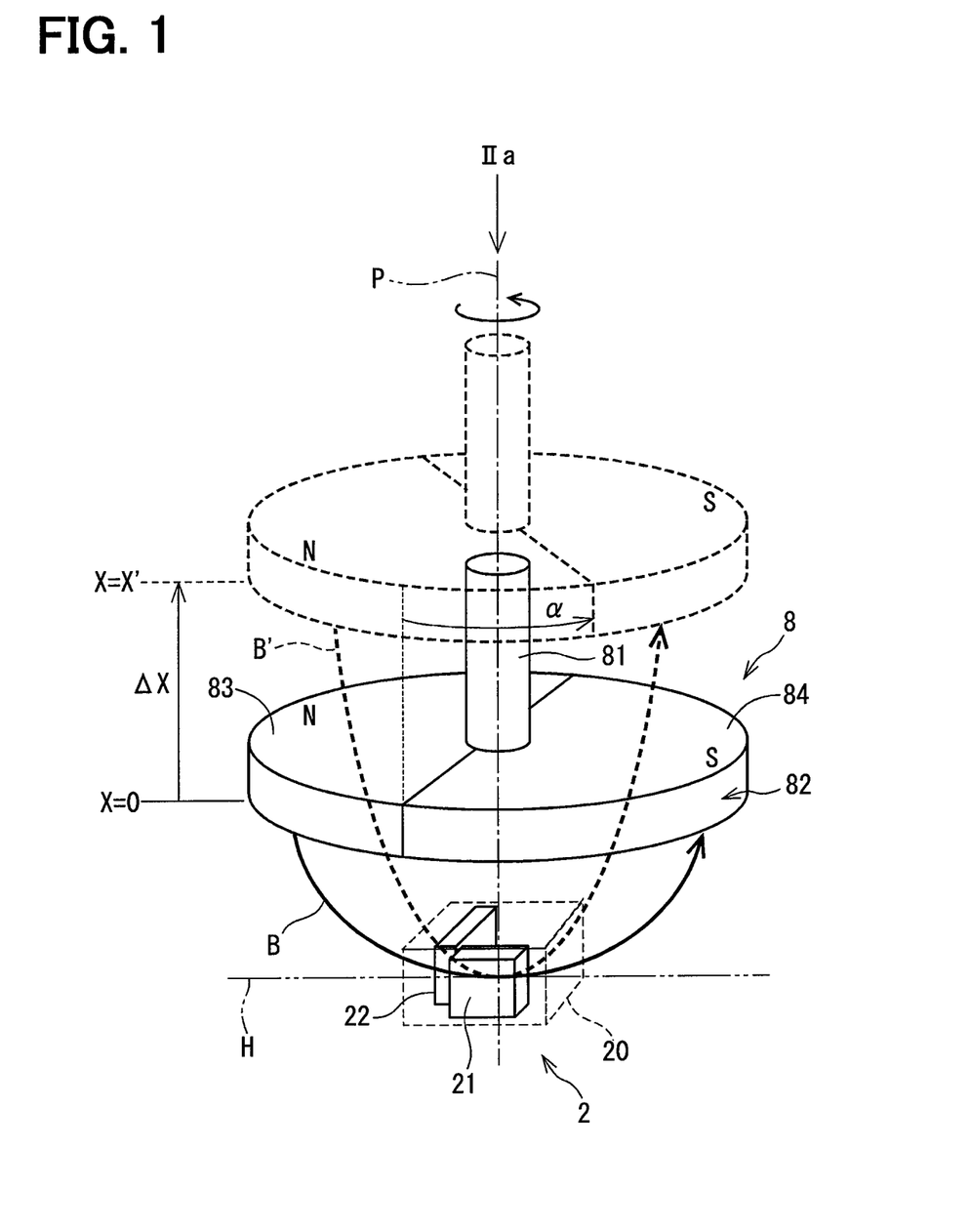
FIG. 1 is a perspective view that explains a detection principle of a rotation angle and stroke amount detection device according to a first embodiment of the present disclosure.
Figure 2A:
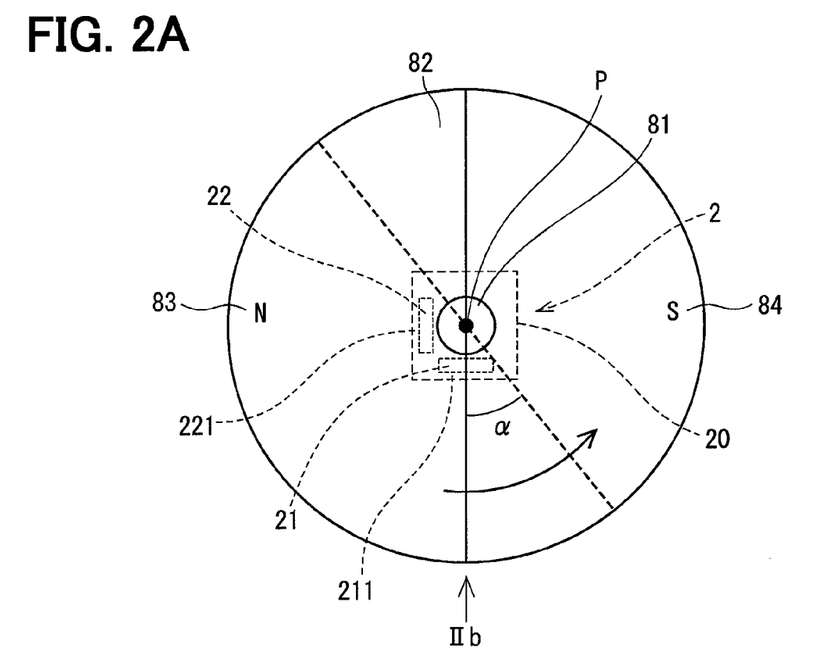
FIG. 2A is a plane view of FIG. 1.
Figure 2B:
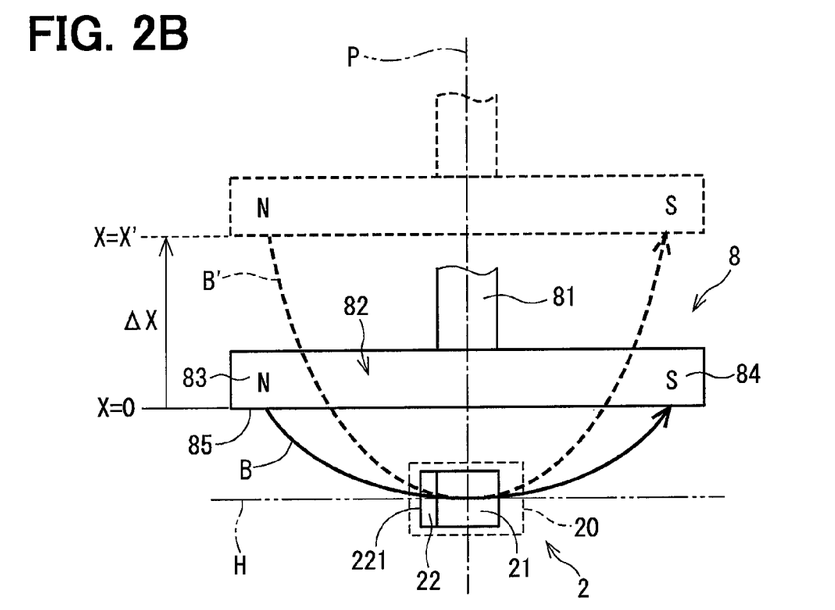
FIG. 2B is a front view of FIG. 1.

In FIGS. 1 and 2, solid lines show the detection target 8 at a reference position, while dashed lines show the detection target 8 after moving from the reference position. At that time, the detection target 8 rotations from the reference position by a rotation angle α in the counter-clockwise direction of FIG. 2A, and linearly displaces from the reference position by a stroke amount ΔX in the upward direction of FIG. 2B. For example, the position X of a disc portion bottom surface 85 along the axis of rotation P may be defined as X=0 in the reference position, and may be defined as X=X' after the linear displacement. In this case, the stroke amount ΔX corresponds to a difference between 0 and X'.

The disc portion 82 of the detection target 8 includes a magnet and generates a magnetic field. Specifically, this magnet includes an N magnetic pole 83 and an S magnetic pole 84 that symmetrically surround the shaft portion 81. As shown by the arrows B and B' in the figures, the magnetic flux of this magnet flow from the N magnetic pole 83, through a sensor unit 2, and toward the S magnetic pole 84. Further, other magnetic flux lines such as those radiating outward are omitted from the figures for brevity.

The sensor unit 2 of a rotation angle and stroke amount detection device is disposed along the axis of rotation P in a position that does not interfere with the detection target 8. In other words, the sensor unit 2 is disposed below the reference position (X=0) of the detection target 8 in FIGS. 1 and 2B. Further, in FIGS. 1 and 2B, a center position of the sensor unit 2 in the axis of rotation P direction is shown with an alternating single long-dash double short-dash line.

The sensor unit 2 includes two magnetic sensing elements 21, 22 that are positioned orthogonal to each other on the axis of rotation P. In other words, magnetic sensitive surfaces 211, 221 of the magnetic sensing elements 21, 22 are positioned with a 90° difference. Here, the magnetic sensing elements 21, 22 may be, for example, Hall elements or magnetic resistive (MR) elements.

Further, in the present embodiment, the two magnetic sensing elements 21, 22 may be integrally formed in a single integrated circuit (IC) package 20 such as a Hall IC. This IC package 20 may also be integrally provided with other circuits of a signal processing device (see FIG. 3) which will be described later.

When the detection target 8 is in the reference position, magnetic flux flows from the N magnetic pole 83, though the two magnetic sensing elements 21, 22 of the sensor unit 2, and toward the S magnetic pole 84 as shown by the solid arrow B. After the detection target 8 moves from the reference position, the same is shown by the dashed arrow B'. The two magnetic sensing elements 21, 22 detect this magnetic flux density.

Specifically, assuming that the rotation angle α remains constant, the detected magnetic flux density increases as the detection target 8 approaches the sensor unit 2. Further, assuming that the position of the detection target 8 along the axis of rotation P direction remains constant, the detected magnetic flux density increases as angle of incidence of the magnetic flux with respect to the magnetic sensitive surfaces 211, 221 of the magnetic sensing elements 21, 22 approaches a right angle, and the detected magnetic flux density decreases as this angle of incidence approaches parallel (i.e., 0°).

In the present embodiment, the reference position is defined as a position where the N magnetic pole 83 and the S magnetic pole 84 lie along a direction parallel to the magnetic sensitive surface 211 of the magnetic sensing element 21 and perpendicular to the magnetic sensitive surface 221 of the magnetic sensing element 22. Accordingly, if the rotation angle α of the detection target 8 is defined as 0° at the reference position, then the magnetic flux density detected by the magnetic sensing element 21 is represented by a sin function, while the magnetic flux density detected by the magnetic sensing element 22 is represented by a cos function. In this regard, hereinafter, the magnetic sensing element 21 may be referred to as a "sin sensor 21", while the magnetic sensing element 22 may be referred to as a "cos sensor 22".

In other words, the sensor unit 2 of the present embodiment includes a set of a sine (or sin) sensor 21 and a cosine (or cos) sensor 22 that are arranged orthogonal to each other on the axis of rotation P. In this case, the magnetic flux density detected by the sin sensor 21 is output as a "sin signal", while the magnetic flux density detected by the cos sensor 22 is output as a "cos signal". Further, the signs of these signal may be set as appropriate by signal processing of the output signals, based on the direction of rotation, or the like. That is, the output signal of the sin sensor 21 is "(sin α or −sin α)*constant", while the output signal of the cos sensor 22 is "(cos α or −cos α)*constant".

Based on the above theory, a rotation angle and stroke amount detection device detects the rotation angle α and the stroke amount ΔX of the detection target 8.

Figure 3:
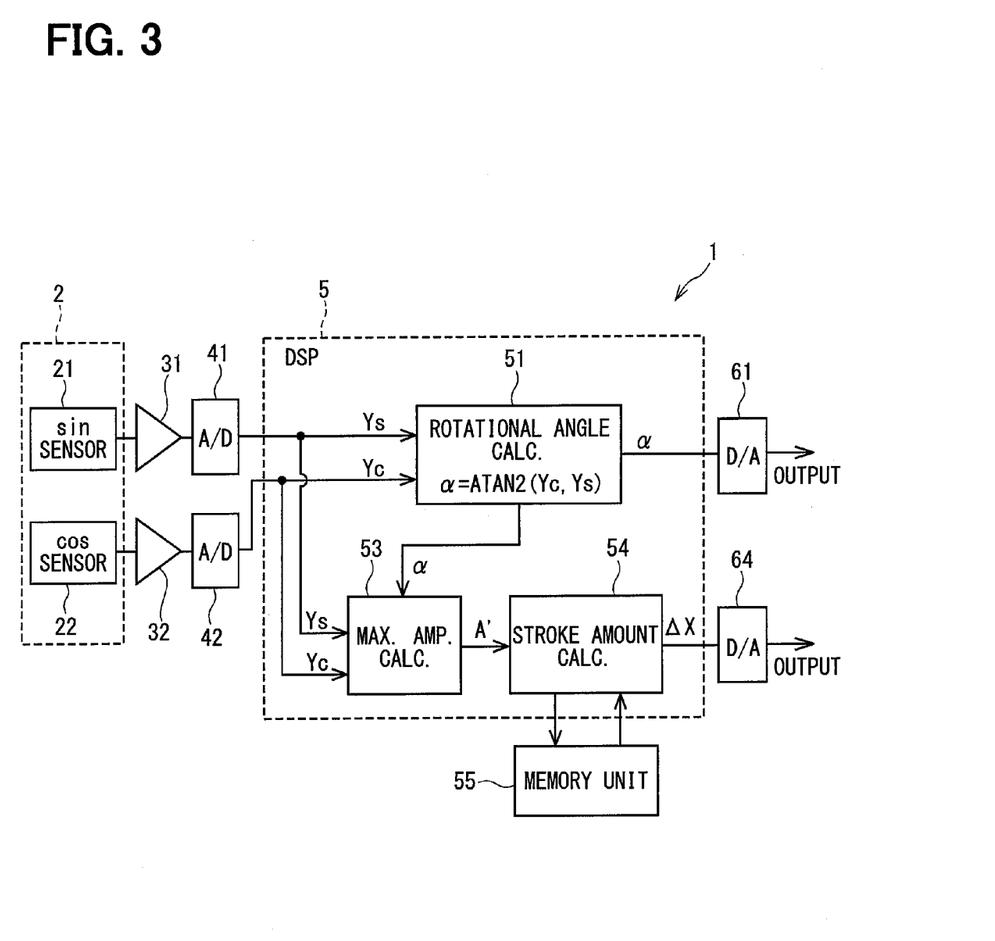
FIG. 3 is a configuration diagram of the rotation angle and stroke amount detection device according to the first embodiment of the present disclosure.

Next, the configuration of a rotation angle and stroke amount detection device will be explained with reference to FIGS. 3 to 5.

A rotation angle and stroke amount detection device 1 includes the sensor unit 2, amplifier circuits 31, 32, analog/digital (A/D) conversion circuits 41, 42, a signal processor 5, and digital/analog (D/A) conversion circuits 61, 64. Here, the sensor unit 2 includes the set of the sin sensor 21 and the cos sensor 22. The amplifier circuits 31, 32 amplify each of the sin signal output by the sin sensor 21 and the cos signal output by the cos sensor 22. The A/D conversion circuits 41, 42 convert the amplified analog signals into digital signals. The signal processor 5 processes the A/D converted digital signals. The D/A conversion circuits 61, 64 convert digital values output from the signal processor 5 into analog values. Here, each of these circuits may be integrally provided inside the IC package 20 together with the sensor unit 2, but may also be provided separately and connected by signal wires as appropriate.

The signal processor 5 may be, for example, a digital signal processor (DSP), and includes a rotation angle calculation unit 51, a maximum amplitude calculation unit 53, and a stroke amount calculation unit 54. The A/D conversion circuits 41, 42 output a sin signal Ys and a cos signal Yc as digital signals, both of which are input to each of the rotation angle calculation unit 51 and the maximum amplitude calculation unit 53.

Figure 4A:
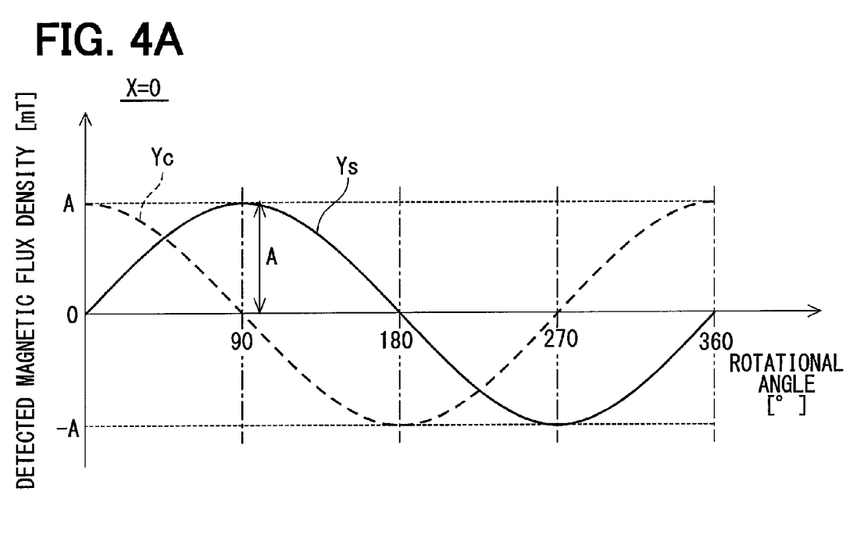
FIG. 4A is a graph showing a relationship between a rotation angle and a detected magnetic flux density when a detection target is at a reference stroke amount position (i.e., X=0)
Figure 5:
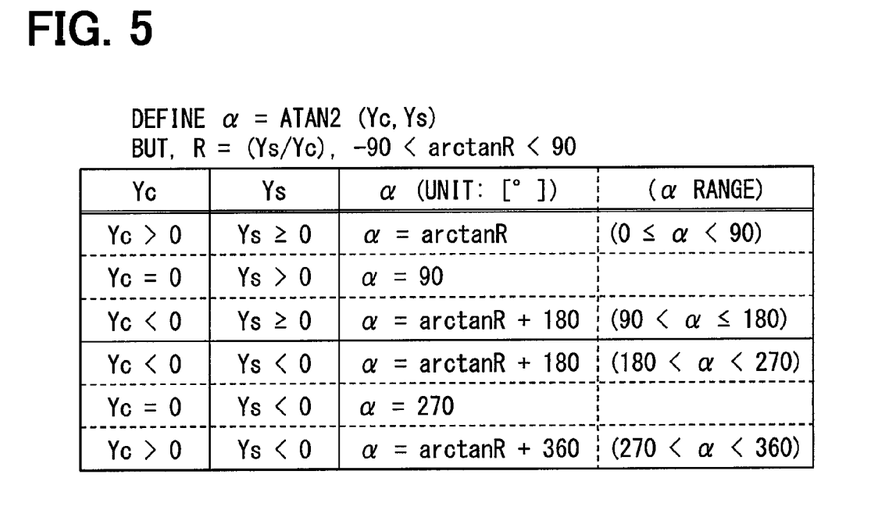
FIG. 5 is a table showing details of a calculation of a rotation angle.

Next, FIG. 4 is explained. In FIG. 4A, the detection target 8 is at the reference stroke position (i.e., X=0) along the axis of rotation P direction, and the characteristics of the sin signal Ys and cos signal Yc (i.e., the detected magnetic flux densities) are shown against the rotation angle α. The rotation angle calculation unit 51 calculates the rotation angle α based on these characteristics. Further, a "reference amplitude A" is defined as the maximum amplitude of the sin signal Ys and cos signal Yc in FIG. 4A.

Figure 4B:
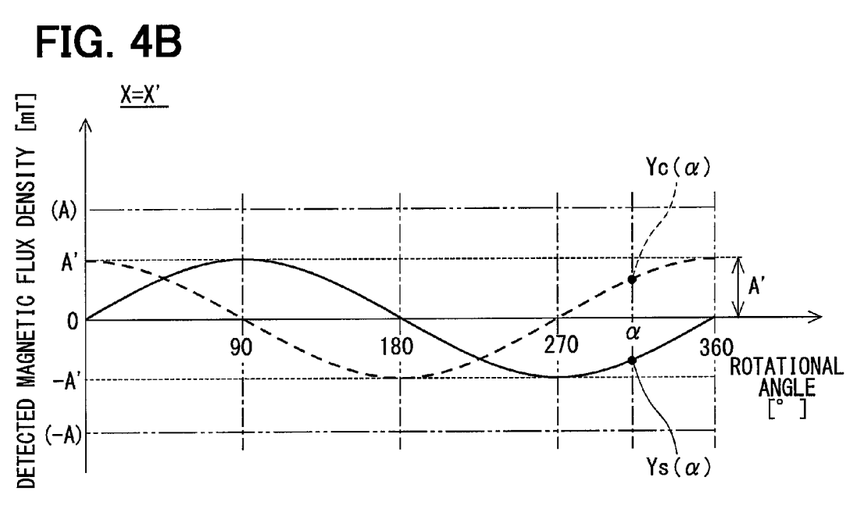
FIG. 4B is a graph showing a relationship between a rotation angle and a detected magnetic flux density when a detection target is at a detection position (i.e., X=X')

Meanwhile, in FIG. 4B, the detection target 8 is linearly displaced along the axis of rotation P by a stroke amount ΔX (i.e., X=X'), and again the characteristics of the sin signal Ys and cos signal Yc are shown against the rotation angle α. At this time, a maximum amplitude A' of the sin signal Ys and cos signal Yc is smaller than the reference amplitude A. The maximum amplitude calculation unit 53 calculates the maximum amplitude A', and the stroke amount calculation unit 54 calculates the stroke amount ΔX based on the maximum amplitude A'.

Next, the calculations of each of the calculation units 51, 53, 54 will be explained in detail.

The rotation angle calculation unit 51 calculates the rotation angle α of the detection target 8 based on the arctangent of an R value, the R value being obtained from a ratio between the sin signal Ys and the cos signal Yc (i.e., diving the sin signal Ys by the cos signal Yc). Specifically, an ATAN2 function is defined as "α=ATAN2(Yc, Ys)" in a range of 0°≤α<360°. Then, as shown in FIG. 5, the ATAN2 function is calculated depending on the signs of the cos signal Yc and the sin signal Ys.

The sin signal Ys and the cos signal Yc, as well as the rotation angle α calculated by the rotation angle calculation unit 51, are input to the maximum amplitude calculation unit 53. Then, the maximum amplitude calculation unit 53 calculates the maximum amplitude A' of the sin signal Ys and the cos signal Yc corresponding to the stroke amount ΔX of the detection target 8. Specifically, as illustrated in FIG. 4B, the maximum amplitude calculation unit 53 performs this calculation using equations (1) or (2) below, based on the values of the sin signal Ys or the cos signal Yc, as well as a sin value of the rotation angle α (i.e., sin α) or a cos value of the rotation angle α (i.e., cos α).

$$A' = Ys/\sin \alpha \quad (1)$$

$$A' = Yc/\cos \alpha \quad (2)$$

The stroke amount calculation unit 54 calculates the stroke amount ΔX of the detection target 8 based on the maximum amplitude A' calculated by the maximum amplitude calculation unit 53.

Figure 6:
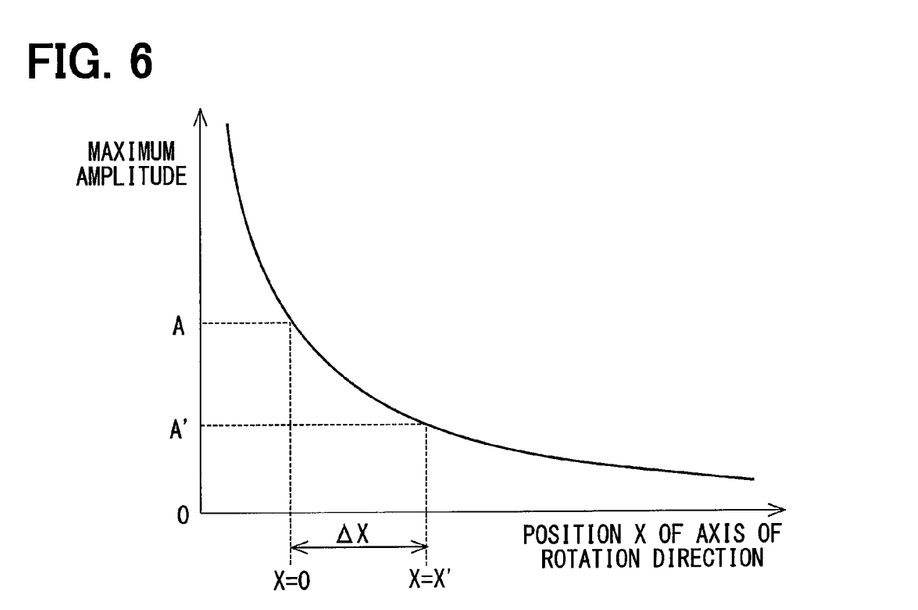
FIG. 6 is a map showing a relationship between a maximum amplitude an a position of an axis of rotation direction (i.e., a stroke amount).

In the present embodiment, as shown in FIG. 6, a memory unit 55 has stored thereon a map that specifies the relationship between the maximum amplitude A' and the stroke amount ΔX. Thus, the stroke amount calculation unit 54 refers to this map to calculate the stroke amount ΔX corresponding to the maximum amplitude A'. The memory unit 55 may be, for example, an EEPROM.

As shown in the map of FIG. 6, the maximum amplitude of detected magnetic flux density is basically proportional to the inverse square of a distance between magnetic poles and magnetic sensing elements. As such, the characteristic line in FIG. 6 is roughly an inverse square shaped curve. In practice, it is preferably to create this map based on experimentation or simulations. Alternatively, an approximate relational expression may be obtained by plotting experimental results, and the stroke amount calculation unit 54 may use this relational expression to calculate the stroke amount ΔX.

Therefore, in the signal processor 5, based on the sin signal Ys detected by the sin sensor 21 and the cos signal Yc detected by the cos sensor 22, the rotation angle calculation unit 51 calculates a rotation angle α, and the stroke amount calculation unit 54 calculates a stroke amount ΔX. The calculated rotation angle α and stroke amount ΔX are converted into analog values by the respective D/A conversion circuits 61, 64 and are output.

The rotation angle and stroke amount detection device 1 of the present embodiment exhibits at least the following effects.

First, the rotation angle and stroke amount detection device 1 of the present embodiment includes the sensor unit 2, the rotation angle calculation unit 51, and the stroke amount calculation unit 54. The sensor unit 2 include the sin sensor 21 and the cos sensor 22, which act as "a plurality of magnetic sensing elements" that detect changes in a magnetic field caused by rotation and linear displacement of the detection target 8. Further, the sensor unit 2 outputs the sin signal Ys and the cos signal Yc based on the detection values of the sin sensor 21 and the cos sensor 22. The rotation angle calculation unit 51 calculates the rotation angle α of the detection target 8 based on the sin signal Ys and the cos signal Yc output from the sensor unit 2. The stroke amount calculation unit 54 calculates the stroke amount ΔX of the detection target 8 based on the same signals as those used by the rotation angle calculation unit 51, i.e., the sin signal Ys and the cos signal Yc.

In a comparative example, different sensors are independently provided to detect a rotation angle α and to detect a stroke amount ΔX for the detection target 8, which rotates about the axis of rotation P and linear displaces along the axis of rotation P. As a result, the configuration of a sensor unit may become complex, and the physical size of a detection device may increase.

In contrast, in the rotation angle and stroke amount detection device 1 of the present embodiment, the rotation angle calculation unit 51 calculates the rotation angle α of the detection target 8 and the stroke amount calculation unit 54 calculates the stroke amount ΔX of the detection target 8 using the same signals output by the sensor unit 2, i.e., the sin signal Ys and the cos signal Yc. Accordingly, the configuration of the sensor unit 2 is simple, and its physical size may be reduced.

Further, the sensor unit 2 of the present embodiment is formed from the set of the sin sensor 21 and the cos sensor 22, which correspond to "two magnetic sensing elements positioned orthogonal to each other on the axis of rotation P". In other words, since these two magnetic sensing elements are positioned on the axis of rotation P and are orthogonal to each other, these two magnetic sensing elements function as the sin sensor 21 that outputs the sin signal Ys based on the rotation angle α of the detection target 8 and the cos sensor 22 that outputs the cos signal Yc based on the rotation angle α of the detection target 8.

As a result, the rotation a over a 360° revolution may be calculated based on the sin signal Ys and the cos signal Yc. Further, by calculating the maximum amplitude A' based on the rotation angle α, the sin signal Ys, and the cos signal Yc, then the stroke amount ΔX may be calculated based on the maximum amplitude A'. Accordingly, a "rotation angle and stroke amount detection device" having a simple configuration may be practically realized.

In addition, the sensor unit 2 of the present embodiment only has one set of the IC package 20 that includes the sin sensor 21 and the cos sensor 22. Accordingly, the complexity and physical size of the sensor unit 2 may be minimized. Moreover, cost savings may be achieved by reducing the number of components.

Other Embodiments

In the sensor unit 2 of the above described embodiment, one of the IC package 20 that includes the sin sensor 21 and the cos sensor 22 is positioned on the axis of rotation P. However, in a sensor unit of a modified embodiment, a plurality of the IC package 20 may be placed along the axis of rotation P to provide a plurality of sets of the sin sensor 21 and the cos sensor 22. For example, a plurality of the IC package 20 may be provided in a redundant manner, so that if any one IC package 20 breaks down, functional IC packages 20 may continue to detect a rotation angle and a stroke amount of the detection target 8 in order to improve reliability.

The sensor unit 2 of the present disclosure is not limited to an integrally formed IC package 20 as described with respect to the first embodiment. Instead, for example, a package that only includes the cos sensor 22 may be placed orthogonal to a package that only includes the sin sensor 21.

Further, the orthogonal positioning of the magnetic sensing elements 21, 22 with the respect to the axis of rotation P is not limited to the orientation shown in FIGS. 1 and 2, and may be provided in any orientation.

The rotation angle calculation unit 51 and the stroke amount calculation unit 54 of the present disclosure may also calculate the rotation angle α and the stroke amount ΔX based on "signals output by a sensor unit" other than the sin signal Ys and the cos signal Yc.

The present disclosure is not intended to be limited to the above described embodiments, and a plurality of embodiments which do not depart from the gist of the present disclosure are contemplated.

The invention claimed is:

1. A rotation angle and stroke amount detection device for detecting a rotation angle and a stroke amount of a detection target which generates a magnetic field, the detection target being rotatable about an axis of rotation and linearly displaceable along the axis of rotation, comprising:
   a sensor unit that includes a plurality of magnetic sensing elements that detect changes in the magnetic field caused by a rotation and a linear displacement of the detection target, the sensor unit outputting a signal based on detection values of the plurality of the magnetic sensing elements;
   a rotation angle calculation unit that calculates the rotation angle of the detection target based on the signal output by the sensor unit; and
   a stroke amount calculation unit that calculates a stroke amount of the detection target based on the same signal as that used by the rotation angle calculation unit, wherein
   two of the plurality of the magnetic sensing elements, which are positioned orthogonal to each other on the axis of rotation, include a sin sensor that outputs a sin signal according to the rotation angle of the detection target and a cos sensor that outputs a cos signal according to the rotation angle of the detection target;
   the sensor unit includes at least one set of the sin sensor and the cos sensor;
   the rotation angle calculation unit calculates the rotation angle of the detection target by calculating an arctangent of a ratio between the sin signal and the cos signal;
   the rotation angle and stroke amount detection device further comprises: a maximum amplitude calculation unit that calculates a maximum amplitude of the sin signal and the cos signal based on a ratio between (i) the sin signal and a sin value, or (ii) the cos signal and a cos value of the rotation angle of the detection target calculated by the rotation angle calculation unit, the maximum amplitude corresponding to the stroke amount of the detection target; and
   the stroke amount calculation unit calculates the stroke amount of the detection target based on the maximum amplitude calculated by the maximum amplitude calculation unit.

2. The rotation angle and stroke amount detection device of claim 1, wherein
   the stroke amount calculation unit calculates the stroke amount of the detection target by using a relational expression or by referring to a map that specifies a relationship between the maximum amplitude and the stroke amount of the detection target.

3. The rotation angle and stroke amount detection device of claim 1, wherein
   the sensor unit includes one set of the sin sensor and the cos sensor.

4. A rotation angle and stroke amount detection device for detecting a rotation angle and a stroke amount of a detection target which generates a magnetic field, the detection target being rotatable about an axis of rotation and linearly displaceable along the axis of rotation, comprising:
   a sensor unit that includes a plurality of magnetic sensing elements that detect changes in the magnetic field caused by a rotation and a linear displacement of the detection target, the sensor unit outputting a signal based on detection values of the plurality of the magnetic sensing elements;
   processing circuitry configured to at least perform:
      a rotation angle calculation that calculates the rotation angle of the detection target based on the signal output by the sensor unit; and
      a stroke amount calculation that calculates a stroke amount of the detection target based on the same signal as that used by the rotation angle calculation, wherein
   two of the plurality of the magnetic sensing elements, which are positioned orthogonal to each other on the axis of rotation, include a sin sensor that outputs a sin signal according to the rotation angle of the detection target and a cos sensor that outputs a cos signal according to the rotation angle of the detection target;
   the sensor unit includes at least one set of the sin sensor and the cos sensor;
   the processing circuitry is further configured to at least perform the rotation angle calculation, that calculates the rotation angle of the detection target, by calculating an arctangent of a ratio between the sin signal and the cos signal;
   the processing circuitry is further configured to at least perform a maximum amplitude calculation that calculates a maximum amplitude of the sin signal and the cos signal based on a ratio between (i) the sin signal and a sin value, or (ii) the cos signal and a cos value of the rotation angle of the detection target calculated by the rotation angle calculation, the maximum amplitude corresponding to the stroke amount of the detection target; and the processing circuitry is further configured to at least perform the stroke amount calculation, that calculates the stroke amount of the detection target, based on the calculated maximum amplitude.

5. The rotation angle and stroke amount detection device of claim 4, wherein the processing circuitry is further configured to at least perform the stroke amount calculation, that calculates the stroke amount of the detection target, by using a relational expression or by referring to a map that specifies a relationship between the maximum amplitude and the stroke amount of the detection target.

6. The rotation angle and stroke amount detection device of claim 4, wherein the sensor unit includes one set of the sin sensor and the cos sensor.

* * * * *